United States Patent
Zhou

(10) Patent No.: US 9,975,213 B2
(45) Date of Patent: May 22, 2018

(54) POLISHING APPARATUS

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventor: Tao Zhou, Jiashan (CN)

(73) Assignees: FU DING ELECTRONICAL TECHNOLOGY (JIASHAN), Jiashan (CN); HON HAI PRECISION INDUSTRY CO., LTD., New Taipei (TW)

(*) Notice: Subject to any disclaimer, the term of this patent is extended or adjusted under 35 U.S.C. 154(b) by 391 days.

(21) Appl. No.: 14/508,392

(22) Filed: Oct. 7, 2014

(65) Prior Publication Data
US 2015/0105004 A1  Apr. 16, 2015

(30) Foreign Application Priority Data

Oct. 12, 2013  (CN) .......................... 2013 1 04746986

(51) Int. Cl.
*B24B 7/00* (2006.01)
*B24B 27/00* (2006.01)
*B24B 41/00* (2006.01)

(52) U.S. Cl.
CPC ........ *B24B 27/0015* (2013.01); *B24B 41/005* (2013.01)

(58) Field of Classification Search
USPC .............................. 451/64, 73, 177, 287, 288
See application file for complete search history.

(56) References Cited

U.S. PATENT DOCUMENTS

| 4,249,346 | A | * | 2/1981 | Theurer | ................ E01B 31/175 451/28 |
| 4,663,889 | A | * | 5/1987 | Strand | ..................... B24B 5/366 451/28 |
| 5,725,413 | A | * | 3/1998 | Malshe | ................... B24B 37/04 451/289 |

FOREIGN PATENT DOCUMENTS

| CN | 103029039 A | * | 4/2013 | ............. B24B 49/00 |
| CN | 103029039 A |   | 4/2013 | |

* cited by examiner

*Primary Examiner* — Joseph J Hail
*Assistant Examiner* — Shantese McDonald
(74) *Attorney, Agent, or Firm* — ScienBiziP, P.C.

(57) ABSTRACT

A polishing apparatus connected to a robot arm and used to polish a workpiece includes a bracket, a polishing assembly, and a positioning assembly. The polishing assembly is mounted on the bracket and includes a driver and a polishing plate connected to the driver. The driver is capable of driving the polishing plate to rotate, and defines an annular positioning groove around the spin axis. The positioning assembly includes a first positioning plate and a second positioning plate mounted on the bracket and opposite to the first positioning plate. The first positioning plate and the second positioning plate are clamped into two sides of the positioning groove, whereby the driver is clamped between the first positioning plate and the second positioning plate.

15 Claims, 3 Drawing Sheets

POLISHING APPARATUS

FIELD

The subject matter herein generally relates to a polishing apparatus.

BACKGROUND

Surface polishing is a process of creating a smooth and shiny surface of a workpiece by repetitively grinding. A polishing apparatus is used to accomplish surface polishing.

BRIEF DESCRIPTION OF THE DRAWINGS

Implementations of the present technology will now be described, by way of example only, with reference to the attached figures.

DETAILED DESCRIPTION

Figure 1:
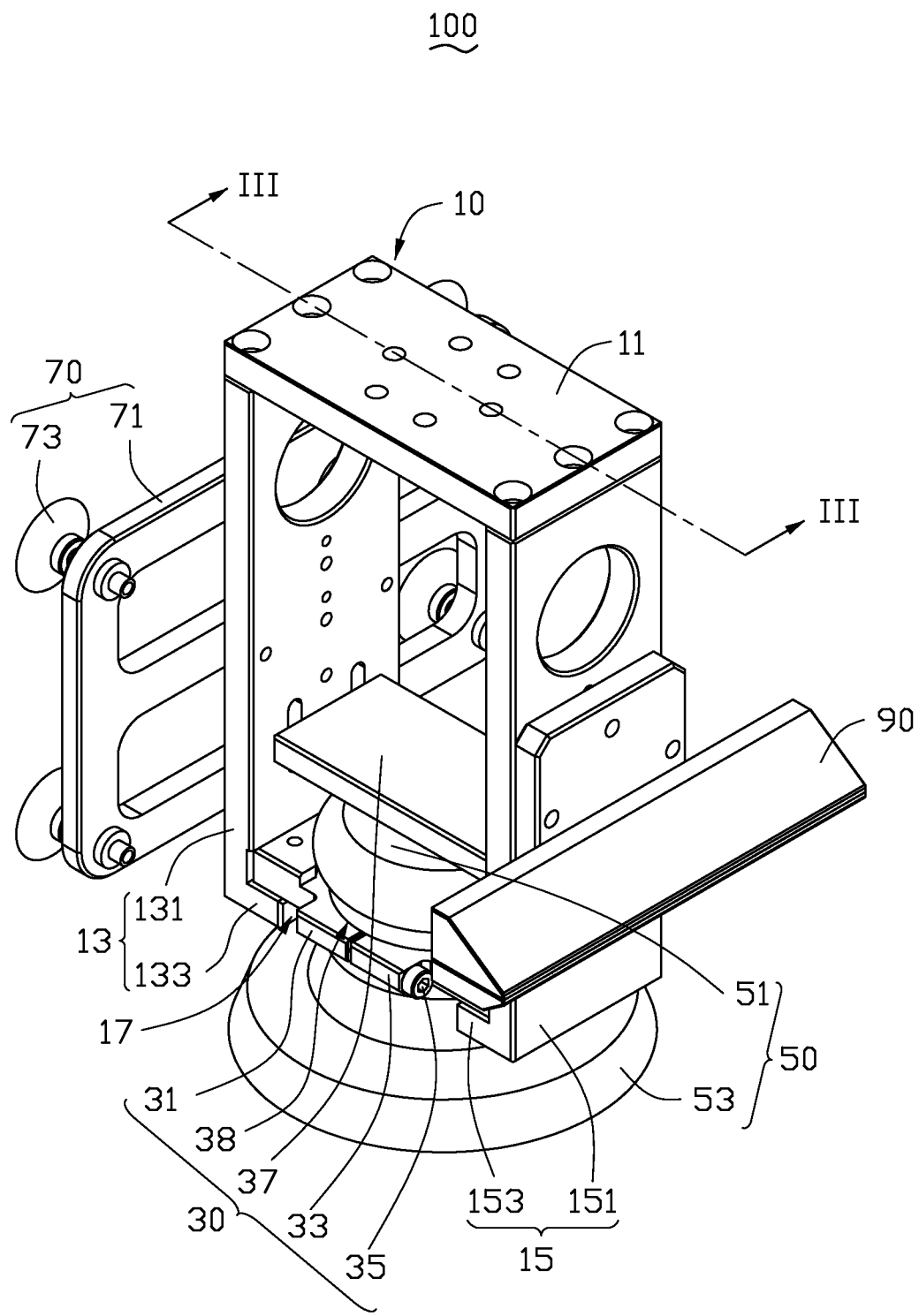
FIG. 1 is an isometric view of a polishing apparatus of an embodiment.

It will be appreciated that for simplicity and clarity of illustration, where appropriate, reference numerals have been repeated among the different figures to indicate corresponding or analogous elements. In addition, numerous specific details are set forth in order to provide a thorough under bracketing of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is in relation to a polishing apparatus used to polish a surface of a workpiece.

FIG. 1 illustrates a polishing apparatus 100 including a bracket 10, a positioning assembly 30, a polishing assembly 50, a suction assembly 70, and an air knife 90. The bracket 10 can be connected to a robot arm (not shown). The positioning assembly 30 can be mounted on the bracket 10 and used to position the polishing assembly 50. The polishing assembly 50 can be mounted on the positioning assembly 30 and used to wet-polish an surface of the workpiece (not shown). The suction assembly 70 and the air knife 90 can be mounted on two opposite sides of the bracket 10. The suction assembly 70 can be used to suck and transfer the workpiece to a predetermined position. The air knife 90 can be used to blow-dry the surface of the workpiece.

The bracket 10 can be a substantially rectangular frame and include a connecting plate 11, a first side plate 13, and a second side plate 15. The connecting plate 11 can be connected to the robot arm. The first side plate 13 and the second side plate 15 can be substantially "L" shaped and mounted at two ends of the connecting plate 11. The first side plate 13 can include a first main body 131 and a first assembly portion 133 perpendicularly extending from one end of the first main body 131. One end of the first main body 131 away from the first assembly portion 133 can be fixedly connected to the connecting plate 11. The second side plate 15 can include a second main body 151 and a second assembly portion 153 perpendicularly extending from one end of the second main body 151. The first main body 131 and the second main body 151 can be substantially parallel to each other, and the first assembly portion 133 and the second assembly portion 153 can be positioned in a same line and distanced from each other. The first assembly portion 133 and the second assembly portion 153 can cooperatively form a receiving space 17.

The positioning assembly 30 can include a first positioning plate 31, a second positioning plate 33, at least one connecting member 35, a spacing plate 37, and a positioning hole 38 between the first positioning plate 31 and the second positioning plate 33. The spacing plate 37 can be substantially rectangular and mounted between the first main body 131 and the second main body 151.

The polishing assembly 50 can be mounted between the second positioning plate 33 and the first positioning plate 31, and include a driver 51 and a polishing plate 53. The driver 51 can be received in the receiving space 17 and the positioning hole 38. The driver 51 can resist against the spacing plate 37 to prevent shifting relative to the first positioning plate 31 and the second positioning plate 38. The driver 51 can be connected to the polishing plate 53 and used to drive the polishing plate 53 to rotate, thus the surface of the workpiece can be polished. The polishing plate 53 can protrude out of the bracket 10, and positioned below the first positioning portion 133 and the second positioning portion 153. In at least one embodiment, the polishing assembly 50 can be an air die grinder.

The suction assembly 70 can be mounted on the first main body 131 and substantially perpendicular to the polishing assembly 50. The suction assembly 70 can include a supporting member 71 and a plurality of suction members 73 mounted on the supporting member 71. The supporting member 71 can be mounted on an outer surface of the first main body 131, and the suction members 73 can be mounted on one side of the bracket away from the first side plate 13 and distanced from each other. The suction assembly 70 can move to the workpiece with the movement of the robot arm, suck and transfer the workpiece to a work platform (not shown). The robot arm can drive the polishing apparatus 100 to rotate, such that the polishing assembly 50 can be align to the workpiece for polishing.

The air knife 90 can be mounted at an outer surface of the second side main body 151 and substantially perpendicular to the polishing assembly 50. The air knife 90 can be connected to an external gas source (not shown). The air knife 90 can be aimed at the surface of the workpiece to blow-dry water on the surface of the workpiece.

Figure 2:
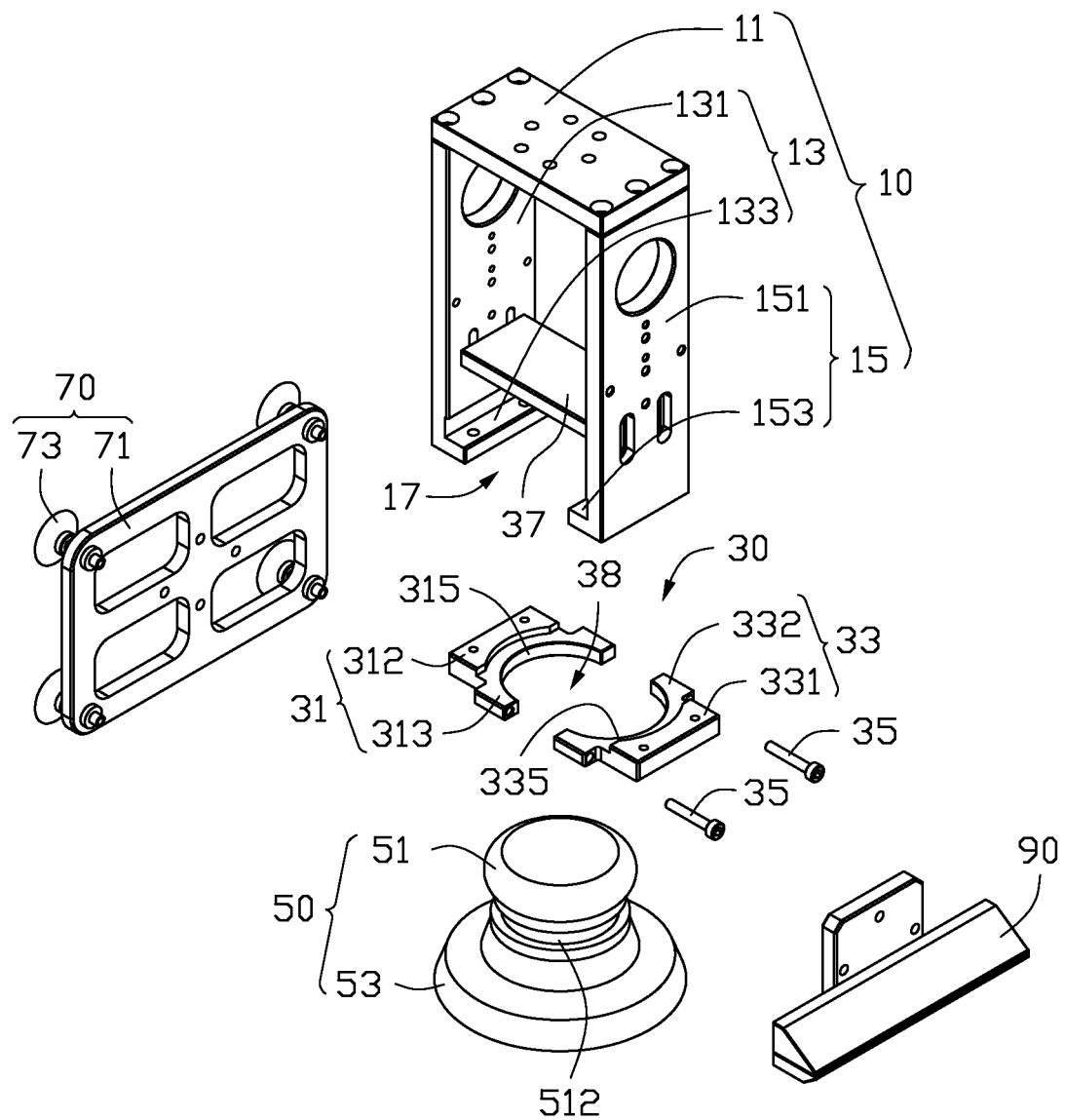
FIG. 2 is an exploded, isometric view of the polishing apparatus of FIG. 1.

FIG. 2 illustrates that the first positioning plate 31 and the second positioning plate 33 can be parallel and distanced from each other. The first positioning plate 31 can include a first main portion 312 and two first connecting portions 313 extending from two sides of the first main portion 312. One end of the first main portion 312 away from the connecting portions 313 can be mounted on the first assembly portion 133, and the other end can define an arc-shaped first groove 315 positioned between the first connecting portions 313 and communicated to the receiving space 17.

The second positioning plate 33 can have a substantially same shape with the first positioning plate 31, and include a second main portion 331 and two second connecting portions 332 extending from one end of the second main portion 331. One end of the second main portion 331 away from the second connecting portions 331 can be mounted on the second assembly portion 153, and the other end can define an arc-shaped second groove 335 positioned between the two second connecting portions 332 and communicated to the receiving space 17.

The positioning hole 38 can be circular and defined by the first groove 315 and the second groove 334. The center of the positioning hole 38 can be arranged around the same axis with the robot. The connecting members 35 can be two, and each connecting member 35 can pass through one of the first connecting portions 313 and the corresponding second connecting portion 332, thus the first positioning plate 31 and the second positioning plate 33 can be fixed together.

The central portion of the driver 51 can define an annular positioning groove 512 on the periphery thereof. The positioning groove 512 can be substantially parallel to the polishing plate 53.

Figure 3:
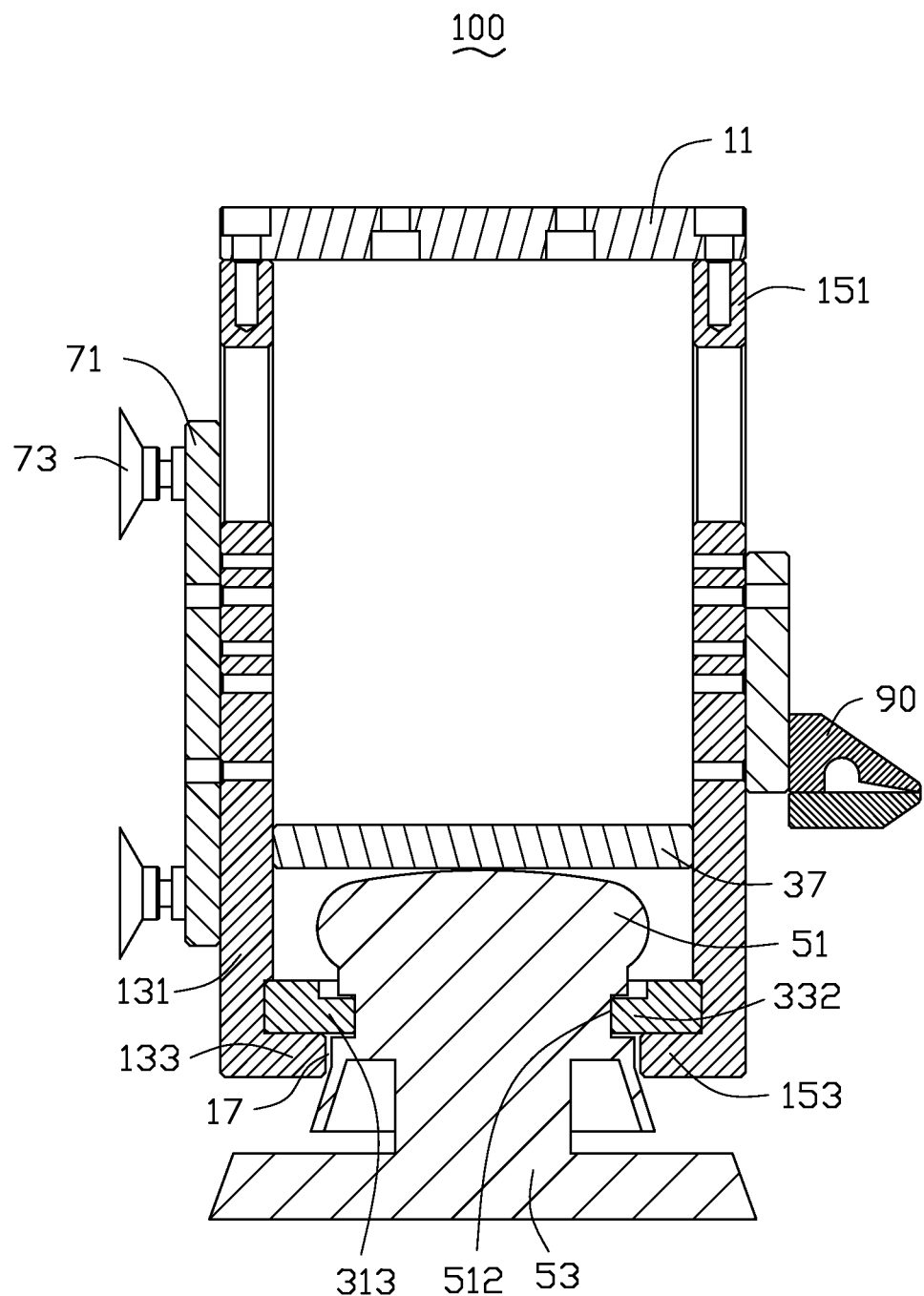
FIG. 3 is an cross-sectional view of the polishing apparatus of FIG. 1 taken along a line III-III.

FIG. 3 illustrates that the first main portion 313 and the second main portion 331 can be clamped into two sides of the positioning groove 512, thus the driver 51 can be clamped between the first positioning plate 31 and the second positioning plate 33. The driver 51 can be arranged around the same axis with the robot. The driver 51 can resist against the spacing plate 37 to prevent shifting.

In assembling, the first main portion 312 and the second main portion 331 can be clamped into two sides of the positioning groove 512, and each of the connecting member 35 can pass through one first connecting portion 313 and one corresponding second connecting portion 332, thus the driver 51 can be positioned between the first positioning plate 31 and the second positioning plate 33. Then, one end of the first main portion 312 can be mounted on the first assembly portion 133, and one end of the second main portion 331 can be mounted on the second assembly portion 153. The driver 51 can be received in the positioning hole 38, and one end of the driver 51 can be resist against the spacing plate 37. After that, the supporting member 71 can be mounted on the outer surface of the first main body 131 of the first side plate 13, and the suction members 73 can be mounted on the side of the supporting member 71 away from the first side plate 13. The air knife 90 can be mounted on the outer surface of the second main body 151 of the second side plate 15 and connected to the external gas source. The connecting plate 11 can then be connected to the robot arm.

In operation, the suction assembly 70 can suck the workpiece, and transfer the workpiece to the work platform driven by the robot arm. Then, the polishing plate 53 can resist against the surface of the workpiece with the movement of the robot arm, and an external water source (not shown) can spray water to the surface of the workpiece at the same time. The driver 51 can drive the polishing plate 53 to rotate and polish the surface of the workpiece. The air knife 90 can align to the workpiece surface with the movement of the robot arm, and blow-dry the workpiece surface. The suction members 73 then suck the workpiece, and transfer the workpiece to next station with the movement of the robot arm.

The polishing apparatus 100 of this disclosure can include the positioning assembly 30, and the positioning assembly 30 can include the first positioning plate 31 and the second positioning plate 33 which clamped into two sides of the positioning groove 512. Therefore, the driver 51 can be fixedly clamped between the first positioning plate 31 and the second positioning plate 33, and arranged in the same axis of the robot arm. The polishing plate 53 would not shift relative to the first positioning plate 31 and the second positioning plate 33, thus would not partially wear out to increase its service life.

Furthermore, the polishing apparatus 100 of this disclosure can include the suction assembly 70 configured to suck and transfer the workpiece, and the air knife 90 configured to blow-dry the workpiece. The polishing apparatus 100 has a simple structure and is convenient to use.

In other embodiments, the spacing plate 37 can be omitted, and the driver 51 can be positioned by the first positioning plate 31 and the second positioning plate 33. The connecting member 35 can be one or more, and the first connecting portion 313 and the second connecting portion 332 can be designed to match to the connecting member 35. The connecting member 35 can also be omitted. The suction assembly 70 and the air knife 90 can be omitted, and the workpiece can be sucked and blow by an external suction assembly and an external blow assembly.

The embodiments shown and described above are only examples. Many details are often found in the art such as the other features of a polishing apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A polishing apparatus connected to a robot arm and used to polish a work piece, the polishing apparatus comprising:
   a bracket comprising:
      a connecting plate;
      a first side plate comprising a first main body and a first assembly portion perpendicularly extending from the first main body; and
      a second side plate comprising a second main body and a second assembly portion perpendicularly extending from the second main body, the first side plate and the second side plate being mounted on two ends of the connecting plate;
   a polishing assembly mounted on the bracket, the polishing assembly comprising:
      a driver; and
      a polishing plate connected to the driver;
      the driver having an annular positioning groove on a periphery thereof, the positioning groove having two sides, the driver configured to drive the polishing plate to rotate;

a positioning assembly comprising:
  a first positioning plate mounted on the bracket; and
  a second positioning plate mounted on the bracket opposite the first positioning plate; and
a suction assembly comprising:
  a supporting member; and
  a plurality of suction members mounted on the supporting member;
  the supporting member mounted on the bracket and substantially perpendicular to the polishing assembly; the plurality of suction members mounted at one side of the supportive member away from the bracket;
wherein the first positioning plate is clamped into one of the two sides of the positioning groove, and the second positioning plate is clamped into the other one of the two sides of the positioning groove, whereby the driver is clamped between the first positioning plate and the second positioning plate; and
wherein the first main body and the second main body are substantially parallel to each other, and the first assembly portion and the second assembly portion are distanced from each other and cooperatively form a receiving space.

2. The polishing apparatus of claim 1, wherein the first positioning plate is mounted on the first assembly portion, the second positioning plate is mounted on the second assembly portion, and the driver is received in the receiving space.

3. The polishing apparatus of claim 1, wherein the positioning assembly further comprises a spacing plate mounted between the first main body and the second main body; the spacing plate is substantially parallel to the first positioning plate and the second positioning plate, and one end of the driver is resisted against the spacing plate.

4. The polishing apparatus of claim 3, wherein,
  the first positioning plate comprises a first main portion; one end of the first main portion is mounted on the first assembly portion, and the other end of the first main portion defines a first groove;
  the second positioning plate comprises a second main portion; one end of the second main portion is mounted on the second assembly portion, and the other end of the second main portion defines a second groove;
  the first groove and the second groove are communicated to the receiving space and cooperatively define a positioning hole;
  the driver is received in the positioning hole, and the first main portion and the second main portion are clamped into two sides of the positioning hole.

5. The polishing apparatus of claim 4, wherein the first positioning plate further comprises a first connecting portion extending from the first main portion, and the second positioning plate further comprises a second connecting portion extending from the second main portion; the positioning assembly further comprises a connecting member passing through the first connecting portion and the second portion.

6. The polishing apparatus of claim 1, wherein the polishing assembly further comprises an air knife used to blow-dry the surface of the workpiece, and the air knife is mounted on the bracket and substantially perpendicular to the polishing assembly.

7. The polishing apparatus of claim 1, wherein the polishing assembly is an air die grinder.

8. A polishing apparatus connected to a robot arm and used to polish a work piece, the polishing apparatus comprising:
  a bracket;
  a polishing assembly mounted on the bracket, the polishing assembly comprising:
    a driver; and
    a polishing plate connected to the driver; the driver having an annular positioning groove on a periphery thereof, the positioning groove having two sides, the driver configured to drive the polishing plate to rotate;
  a positioning assembly comprising:
    a first positioning plate mounted on the bracket;
    a second positioning plate mounted on the bracket opposite the first positioning plate, and
    a spacing plate mounted between the first positioning plate and the second positioning plate, the spacing plate being substantially parallel to the first positioning plate and the second positioning plate; and
  a suction assembly comprising:
    a supporting comprising;
    a plurality of suction members mounted on the supporting member;
    the supporting member mounted on the bracket and substantially perpendicular to the polishing assembly; the plurality of suction members mounted at one side of the supporting member away from the bracket;
  wherein one end of the driver is resisted against the spacing plate, the first positioning plate is clamped into one of the two sides of the positioning groove, and the second positioning plate is clamped into the other one of the two sides of the positioning groove, whereby the driver is clamped between the first positioning plate and the second positioning plate.

9. The polishing apparatus of claim 8, wherein the bracket comprises a connecting plate, a first side plate, and a second side plate; the first side plate and the second side plate are mounted on two ends of the connecting plate.

10. The polishing apparatus of claim 9, wherein,
  the first side plate includes a first main body and a first assembly portion perpendicularly extending from the first main body;
  the second side plate includes a second main body and a second assembly portion perpendicularly extending from the second main body;
  the first main body and the second main body are substantially parallel to each other, and the first assembly portion and the second assembly portion are distanced from each other and cooperatively form a receiving space.

11. The polishing apparatus of claim 10, wherein the first positioning plate is mounted on the first assembly portion, the second positioning plate is mounted on the second assembly portion, and the driver is received in the receiving space.

12. The polishing apparatus of claim 8, wherein,
  the first positioning plate comprises a first main portion; one end of the first main portion is mounted on the first assembly portion, and the other end of the first main portion defines a first groove;
  the second positioning plate comprises a second main portion; one end of the second main portion is mounted on the second assembly portion, and the other end of the second main portion defines a second groove;

the first groove and the second groove are communicated to the receiving space and cooperatively define a positioning hole;

the driver is received in the positioning hole, and the first main portion and the second main portion are clamped into two sides of the positioning hole.

13. The polishing apparatus of claim 12, wherein the first positioning plate further comprises a first connecting portion extending from the first main portion, and the second positioning plate further comprises a second connecting portion extending from the second main portion; the positioning assembly further comprises a connecting member passing through the first connecting portion and the second portion.

14. The polishing apparatus of claim 8, wherein the polishing assembly further comprises an air knife used to blow-dry the surface of the workpiece, and the air knife is mounted on the bracket and substantially perpendicular to the polishing assembly.

15. The polishing apparatus of claim 8, wherein the polishing assembly is an air die grinder.

\* \* \* \* \*

UNITED STATES PATENT AND TRADEMARK OFFICE
CERTIFICATE OF CORRECTION

PATENT NO. : 9,975,213 B2  
APPLICATION NO. : 14/508392  
DATED : May 22, 2018  
INVENTOR(S) : Tao Zhou Page 1 of 1

It is certified that error appears in the above-identified patent and that said Letters Patent is hereby corrected as shown below:

On the Title Page

Please replace item (73) regarding "Assignees" with the following:

(73) Assignees: FU DING ELECTRONICAL TECHNOLOGY (JIASHAN)
CO., LTD., Jiashan (CN);
HON HAI PRECISION INDUSTRY CO., LTD., New Taipei (TW)

Signed and Sealed this  
Twenty-ninth Day of October, 2019

Andrei Iancu  
*Director of the United States Patent and Trademark Office*